United States Patent [19]

Kanamine et al.

[11] Patent Number: 4,974,110
[45] Date of Patent: Nov. 27, 1990

[54] THIN FILM MAGNETIC HEAD FOR PERPENDICULAR RECORDING AND REPRODUCING

[75] Inventors: Michiaki Kanamine, Isehara; Takao Koshikawa, Yokohama, both of Japan

[73] Assignee: Fujitsu Limited, Kawasaski, Japan

[21] Appl. No.: 361,181

[22] Filed: Jun. 5, 1989

[30] Foreign Application Priority Data

Sep. 27, 1988 [JP] Japan ................................ 63-242887

[51] Int. Cl.$^5$ .......................... G11B 5/147; G11B 5/31
[52] U.S. Cl. ................................................. 360/126
[58] Field of Search ................................ 360/126, 121

[56] References Cited
U.S. PATENT DOCUMENTS

| | | | |
|---|---|---|---|
| 4,404,609 | 9/1983 | Jones | 360/126 |
| 4,546,398 | 10/1985 | Toda et al. | 360/126 |
| 4,703,382 | 10/1987 | Schewe et al. | 360/126 |
| 4,843,507 | 6/1989 | Schewe et al. | 360/126 |

Primary Examiner—Robert S. Tupper
Attorney, Agent, or Firm—Armstrong, Nikaido, Marmelstein, Kubovick & Murray

[57] ABSTRACT

A thin film magnetic head for perpendicularly recording and reproducing is disclosed. The magnetic head comprises a main magnetic pole of a thin film, a spiral coil of an electrically conductive film disposed on one side of the main magnetic pole, a first auxiliary magnetic pole of a thin film covering the coil, and a second auxiliary magnetic pole disposed on the other side of the main magnetic pole, forming a substrate or being formed on a non-magnetic substrate. The distributed magnetic leakage path between the main magnetic pole and the second auxiliary magnetic pole plays an important role in the present invention. When the second auxiliary magnetic pole is properly arranged, the magnetic flux flowing through two magnetic paths and interlinking the coil, are cancelled by each other and edge noise due to magnetic flux generated at the second auxiliarly magnetic pole by a magnetic transition of the recording medium is minimized. The low edge noise characteristic enhances the recording and reproducing efficiency of the thin film magnetic head.

18 Claims, 6 Drawing Sheets

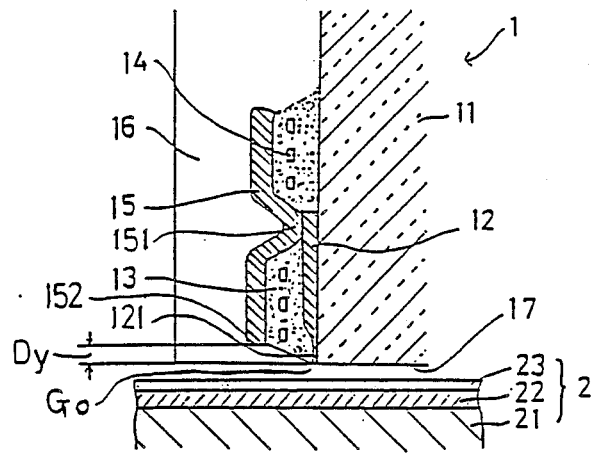
FIG. 2(b) PRIOR ART
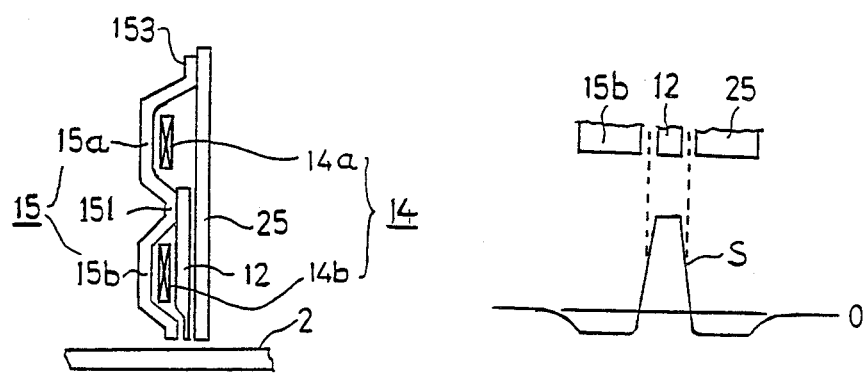
FIG. 3(a) PRIOR ART
FIG. 3(b) PRIOR ART

THIN FILM MAGNETIC HEAD FOR PERPENDICULAR RECORDING AND REPRODUCING

BACKGROUND OF THE INVENTION

1. Field of the Invention

The present invention relates to a thin film magnetic head for recording and reproducing information on a perpendicularly movable magnetic medium, and more particularly, to a thin film magnetic head which has particular features of a high recording density and a high resolution while minimizing edge noise, and which can be easily fabricated.

2. Description of the Prior Art

Magnetic heads for perpendicular recording fall roughly into two groups, one called an auxiliary pole excitation type and the other called a main pole excitation type. The former type has a disadvantage which requires disposing an auxiliary pole having an excitation coil on the back side of a recording medium. Therefore, the inductance of the excitation coil must be high and a large distance is required between the main pole and auxiliary pole which reduces recording and reproducing efficiencies.

On the other hand, in the magnetic head of the latter type, both a main magnetic pole and excitation coil are disposed on the same front side of the recording medium. Therefore, the magnetizing efficiency to the recording medium becomes unrelated to the thickness thereof. Various design configurations are proposed with regard to a thin film magnetic head of the main pole excitation type for perpendicular recording and reproducing. An example of this type is disclosed in the following Japanese Unexamined Patent Publication "SHO-55-4730" laid-opened on Jan. 14, 1980, by S. Kawakami et al., A simplified cross section thereof is schematically shown in FIG. 1.

A substrate 52 of soft magnetic material has a cut away portion which is filled subsequently with non-magnetic insulating material 55. The substrate 52 with the filled material 55 forms a slider of the magnetic head. A thin film spiral coil 53 is formed on a side surface of the substrate 52 insulated therefrom by an insulating layer 54, and a main magnetic pole 51 of soft magnetic material is formed on a front portion thereof. A protective layer 56 covers the entire surface. The first example shows that the main magnetic pole 51 forms a single magnetic enclosure or path with the substrate 52 and a recording medium 2, interlinking the spiral coil 53.

Responding to requirements to improve the recording density in the recording medium and enhancing the resolution in reproducing information therefrom, another improved type of a perpendicular magnetic head of the prior art, is disclosed in U.S. Pat. No. 4,546,398 by J. Toda et al, issued Oct. 8, 1985.

FIGS. 2(a) and 2(b) show a plan view and a cross section of one of the embodiments disclosed therein, in which the cross section is taken along the line A-A in FIG. 2(a). A magnetic head 1 comprises a non-magnetic substrate 11 and a main, thin film, magnetic pole 12 formed thereon. An insulating layer 13 is further formed thereon in which a thin film excitation coil 14 having a spiral configuration is buried. An auxiliary magnetic pole 15 is formed on the insulating layer 13 and a protection layer 16 covers the entire surface.

A recording medium 2 has a laminated structure comprising a base layer 21, an underlying layer 22, and a recording layer 23. The underlying layer 22 is a soft magnetic material having a high permeability, and the recording layer 23 is a magnetic material having a high coercive force.

The main magnetic pole 12 has a narrow tip portion 121 in order to concentrate the magnetic flux onto a small area on the recording medium 2. The auxiliary magnetic pole 15 has a protruding portion 151 which contacts the rear end of the main magnetic pole 12. The excitation coil 14 surrounds the protruding portion 15 and both ends of the coil 14 include leads 18 which are connected to an external circuitry for signal processing.

When the coil 14 is excited for recording, a substantial part of the generated magnetic flux flows through a magnetic path interlinking the front (lower half) portion of the excitation coil 14. The magnetic path or enclosure comprises the main magnetic pole 12, the recording layer 23, the underlying layer 22, the recording layer 23 again, and the front portion of the auxiliary magnetic pole 15. The magnetic flux crosses the gap $G_0$ concentrated by the narrow width of the tip portion 121 of the main magnetic pole, and the strong magnetic field magnetizes the recording layer 23 in perpendicular direction. Next the magnetic flux extends through the underlying layer 22 of soft magnetic material in a lateral direction and returns to the auxiliary magnetic pole 15 crossing the recording layer 23 again. On the return path, the magnetic flux does not strongly affect the recording layer 23, which causes a pseudo-pulse signal during read operation, because the tip portion 152 of the auxiliary magnetic pole facing the recording medium has a broad width and is recessed by a predetermined dimension Dy from the level or plane of the tip portion 121 of the main magnetic pole.

When reproducing information, recorded in the recording medium, the recording medium 2 moves close to the main magnetic pole, and a transition of the perpendicular magnetization in the recording medium causes a change in magnetic flux along the magnetic enclosure or path as described above. This results in inducing a current which flows through the coil 14, and is processed resulting in reproducing a signal corresponding to the recorded information.

In the structure of the magnetic head as explained in the first and second types of FIGS. 1, 2(a) and 2(b), a single conspicuous magnetic enclosure is formed, in other words, a single magnetic gap is formed between two magnetic poles. Though the rear or upper half portion of the coil 14 in FIG. 2(b) is covered by an upper portion 15a of the auxiliary magnetic pole, it does not form a conspicuous magnetic enclosure, therefore, it does not affect much the magnetic field in the gap $G_0$.

Further, another type of a thin film magnetic head for perpendicular recording and reproducing is disclosed in U. S. Pat. No. 4,404,609 by R. E. Jones, Jr., issued Sept. 13, 1983. An embodiment disclosed therein provides two auxiliary magnetic poles, and the embodiment provides two magnetic gaps. The embodiment enhances magnetizing forces at a tip portion of the main magnetic pole and improves the recording and reproducing efficiency of the recording medium. A schematic cross section of the embodiment is shown in FIG. 3(a). The same reference numerals are used to denote the similar parts as those used in FIGS. 2(a) and 2(b).

The magnetic head of FIG. 3(a) has a second auxiliary magnetic pole 25 and the rear end portion thereof contacts a rear end portion 153 of the first auxiliary magnetic pole 15. The widths of the magnetic layers, which form the main magnetic pole 12 and first and second magnetic poles 15 and 25, are progressively narrower as their distance from a non-magnetic substrate 11 or slider increases. The gaps between the surface of the recording medium 2 and each pole tip are the same. The thickness of the tip portion of the main magnetic pole 12 is made less than those of other two auxiliary poles such as about 1 micron versus 2.5–3 microns.

The configuration of FIG. 3(a) has two distinct magnetic enclosures; the first enclosure starting from contact point 151, passes through main magnetic pole 12, recording medium 2, front half portion of auxiliary magnetic pole 15b, and then returns to the contact point 151 in a clockwise direction; and the second enclosure starting from contact point 151, passes through main magnetic pole 12, recording medium 2, second auxiliary magnetic pole 25, rear half of first auxiliary magnetic pole 15a, and then returns to the contact point 151 in a counterclockwise direction. Because current directions interlinking the front and rear portions 14a and 14b of the coil 14 are opposite, the magnetic fields generated in the common gap between the tip of the main magnetic pole 12 and the recording medium 2 are additive. On the other hand, the directions of magnetic force induced at the tip portion of the first and second auxiliary poles are in opposite directions with regard to that of the main magnetic pole.

The embodiment of FIG. 3(a) has the advantage that the magnetizing force in the recording medium at the tip portion of the main magnetic pole 12 is substantially enhanced by the existence of the second auxiliary magnetic pole.

When the magnetic head of this type is used, the signal generated during reproducing operation can be reshaped such as a signal shape S shown in FIG. 3(b). The signal S has a single positive pulse, and has leading and trailing negative pulses. The signal S can be sensed as a single narrow pulse by the prior art technology similar to the output of the single gap two-pole thin film transducer for longitudinal recording.

When the structure of the magnetic head disclosed in one of the above three references of the prior art is utilized, it has been found that edge noise is generated during reproducing by the auxiliary pole and can not be neglected, and this deteriorates the recording and reproducing efficiency.

SUMMARY OF THE INVENTION

It is a general object of the present invention, therefore to provide a thin film magnetic head for perpendicular recording and reproducing which has a high recording and reproducing capability.

It is a more specific object of the present invention to provide a thin film magnetic head which generates a large magnetizing force onto the recording medium at the region of the main magnetic pole, and has minimum edge noise during reproducing, at the regions of the auxiliary magnetic poles.

It is another object of the invention to provide a thin film magnetic head which can be easily fabricated by thin film technology.

The foregoing and related objects are accomplished by a magnetic head of the present invention which comprises a thin film main magnetic pole; a thin film spiral coil disposed adjacent to and substantially parallel to the plane of the main magnetic pole, the center of the coil being arranged at a rear end portion of the main magnetic pole; a first auxiliary magnetic pole disposed adjacent to and substantially parallel to the plane of the coil, the center portion thereof contacting the rear end portion of the main magnetic pole; and a second auxiliary magnetic pole disposed on another side of the main magnetic pole, with a rear end portion of the first auxiliary magnetic pole contacting the second auxiliary magnetic pole. The invention further comprises an arrangement of the above component parts such that induced magnetic flux flowing through first and second magnetic enclosures or paths is substantially equal and opposite in direction with each other, wherein the first magnetic path comprises the tip portion of the second auxiliary magnetic pole, a front portion of the second auxiliary magnetic pole, the main magnetic pole through a distributed leakage path, a front portion of the first auxiliary magnetic pole, and a recording medium, and the second magnetic enclosure or path the tip portion of the second auxiliary magnetic pole, the second auxiliary magnetic pole, a rear portion of the first auxiliary magnetic pole, the main magnetic pole, and the recording medium.

In the present invention, the distributed leakage path between the main magnetic pole and the second auxiliary magnetic pole forms an independent magnetic enclosure or path which is disregarded in the prior art. This magnetic path plays an important role in the magnetic head having two auxiliary magnetic poles. When the first and second auxiliary magnetic poles are arranged unsymmetrically with regard to the main magnetic pole such that the distance between the main magnetic pole and the second auxiliary magnetic pole is made larger and selected to have a predetermined value as disclosed in the present invention, the magnetic flux induced in two magnetic paths, each interlinking the coil, cancel each other resulting in almost no edge noise due to the second auxiliary pole.

BRIEF DESCRIPTION OF THE DRAWINGS

FIGS. 2(a) and 2(b) show a plan view and a cross section of another prior art thin film magnetic head having a main magnetic pole and a single auxiliary pole of thin film.

FIG. 3(a) shows a schematic cross section of still another prior art thin film magnetic head having a main magnetic pole and two auxiliary magnetic poles of thin film disposed on both sides of the main magnetic pole.

FIG. 3(b) shows a signal pulse shape when the magnetic head of FIG. 3(a) is used for reproducing.

DETAILED DESCRIPTION OF THE PREFERRED EMBODIMENTS

Figure 4:
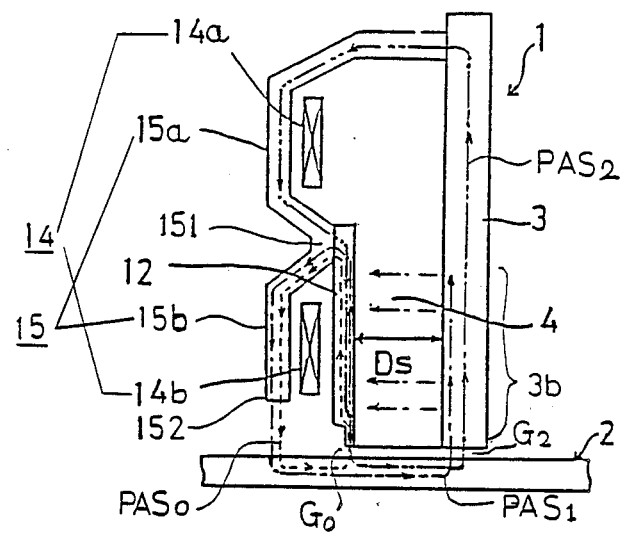
FIG. 4 shows a schematic cross section of a thin film magnetic head of the present invention for the purpose of explaining the principle of the present invention.

FIG. 4 shows a cross section of a basic configuration of a thin film magnetic head of the present invention for the purpose of explaining the principle thereof. The same reference numerals denote the same or the like parts used in the prior art devices. An auxiliary magnetic pole 15 of a thin film is provided and the center portion 151 thereof is in contact with a rear end portion of a main magnetic pole 12. Another auxiliary magnetic pole 3 is provided on an opposite side of the main magnetic pole 12, and both rear ends of the auxiliary magnetic poles contact each other. Hereinafter, the auxiliary magnetic pole 15 is called a first auxiliary magnetic pole and the other auxiliary magnetic pole 3 is called a second auxiliary magnetic pole. The second auxiliary magnetic pole 3 may be a substrate of soft magnetic material or a layer of soft magnetic material formed on a substrate of non-magnetic material. The substrate in either case has the function of a slider which maintains the magnetic head 1 close to a recording medium 2 or in contact therewith. A spiral coil 14 of a thin film is formed surrounding the contact region 151. The first auxiliary magnetic pole 15 is formed covering the spiral coil 14 sandwiching a thin layer of non-magnetic insulating material (not shown) therebetween. In FIG. 4, the space enclosed by the first and second auxiliary poles 15 and 3 is assumed to be filled with a non-magnetic insulating material 4.

The recording medium 2 moves in contact with or close to both tips of the main magnetic pole 12 and second auxiliary magnetic pole 3. On the other hand, the front tip 152 of the first auxiliary pole is a short distance from the surface of the recording medium 2. The main magnetic pole 12 and first and second auxiliary magnetic poles 15 and 3 are made of soft magnetic material, and the recording medium also comprises a magnetic layer, therefore, the magnetic enclosures or paths form magnetic circuits.

Three magnetic paths, which are interlinking the coil 14, play an important role during operation of the magnetic head. The first magnetic path is formed by a closed circuit which is denoted as $PAS_0$, including a gap $G_0$, the main magnetic pole 12, the contact region 151, a front half 15b of the first auxiliary magnetic pole 15, and the recording medium 2. The second magnetic path is formed by a closed circuit $PAS_1$ including a gap $G_2$, a front half 3b of the second auxiliary magnetic pole 3, a distributed leakage path to the main magnetic pole 12, the contact region 151, a front half 15b of the first auxiliary magnetic pole 15, and the recording medium 2. The third magnetic path is formed by a closed circuit $PAS_2$ including the gap $G_2$, the second auxiliary magnetic pole 3, a rear portion 15a of the first auxiliary magnetic pole 15, the contact region 151, the main magnetic pole 12, and the recording medium 2.

The magnetic flux interlinking the coil 14 and passing through the gap $G_0$ between the main magnetic pole 12 and the recording medium 2 plays a main function in recording or reproducing during operation. The directions of the magnetic paths $PAS_0$ and $PAS_2$ crossing the gap $G_0$ are assumed to be opposite. The directions of the coil current flowing through the coil 14 which interlinks the two magnetic paths $PAS_0$ and $PAS_2$ are also opposite with regard to the sheet surface of the figure. Therefore, the magnetic fluxes caused by the coil current flowing through two magnetic paths are additive at the gap $G_0$ and contribute to enhance the recording efficiency of the magnetic head. A similar effect can be expected in enhancing the reproducing efficiency.

The provision of the second auxiliary magnetic pole 3, on the other hand, has the disadvantage of generating edge noises in reproducing by a magnetic transition of the recording medium moving at the gap $G_2$. The magnetic flux induced at the gap $G_2$ between the second auxiliary magnetic pole 3 and the recording medium 2 is now examined during the reproducing operation. The directions of the magnetic paths $PAS_1$ and $PAS_2$ are assumed in the same counter-clockwise directions as shown in FIG. 4. Because two magnetic paths interlink a front portion 14b and rear portion 14a of the coil 14 respectively in which the induced coil currents flow in opposite directions with regard to the sheet surface, the effects caused by the two magnetic paths are caused by the difference thereof.

Figure 5A:
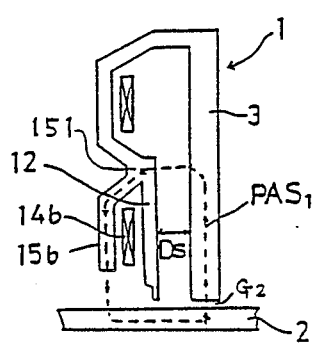
FIGS. 5(a) and 5(b) show a schematic cross section and a signal response curve when the distance Ds between a main magnetic pole and second auxiliary magnetic pole is small, wherein a magnetic path $PAS_1$ interlinking a spiral coil predominates the edge noise.
Figure 5B:

In the prior art of FIG. 3 3(a), though a distance Ds between the main magnetic pole 12 and the second auxiliary magnetic pole is very small in the design of the magnetic head, the leakage path between the second auxiliary magnetic pole 3 and the main magnetic pole 12 forming the magnetic path $PAS_1$ has been disregarded. The present invention makes it clear that, when Ds is very small, the effect of $PAS_1$ predominates over that of $PAS_2$ because of a low magnetic resistance in the leakage path. When the magnetic flux is induced at the tip of the second auxiliary magnetic pole by a transition of magnetization in the recording medium 2 in the reproducing operation, the induced magnetic flux is sensed as edge noises generated along the $PAS_1$ which interlinks the coil 14b. This deteriorates the reproducing efficiency. FIG. 5(a) shows a schematic cross section for this case, and FIG. 5(b) shows a signal response curve when the magnetic head of FIG. 5(a) is used for reproducing. A pulse $P_1$ is the main signal pulse generated by the magnetic transition in the recording medium, and $P_2$ is the edge noise pulse having the same polarity as the main pulse due to the magnetic path $PAS_1$.

Figure 6A:
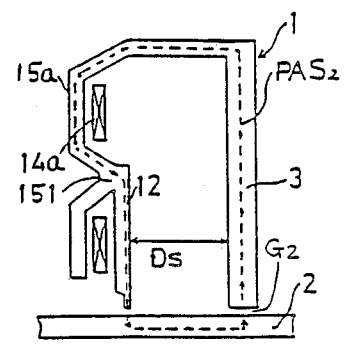
FIGS. 6(a) and 6(b) show a schematic cross section and a signal response curve when the distance Ds is comparatively large, wherein a magnetic path $PAS_2$ interlinking the spiral coil predominates the edge noise.
Figure 6B:
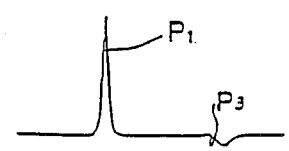

When the distance Ds is selected to be large according to the present invention such as shown in FIG. 6(a), a magnetic resistance of $PAS_1$ increases especially through the leakage path between the second auxiliary magnetic pole 3 and the main magnetic pole 12. Then, the magnetic flux along the magnetic path $PAS_2$ predominates the interaction between the coil 14a and the magnetic transition of the recording medium 2. The response curve is shown in FIG. 6(b), in which an edge noise pulse $P_3$ has a reversed polarity with regard to the main signal pulse $P_1$.

According to the present invention, the effects of magnetic flux due to two magnetic paths $PAS_1$ and $PAS_2$ are selected to be essentially equal and opposite in polarity, which is achieved by choosing the distance Ds to be sufficiently large and have a predetermined value. The edge noise due to each of the magnetic paths $PAS_1$ and $PAS_2$ cancel each other and thus can be minimized. The minimum edge noise can be achieved by selectively choosing the distance Ds as described above, in other words, by selectively determining the magnetic resistance (magnetic reluctance) along the paths PAS₁ and PAS₂. The magnetic reluctance change may be achieved by a change of magnetic head structure such as the distance Ds, thickness of magnetic poles, permeability of soft magnetic material, etc.

Figure 7A:
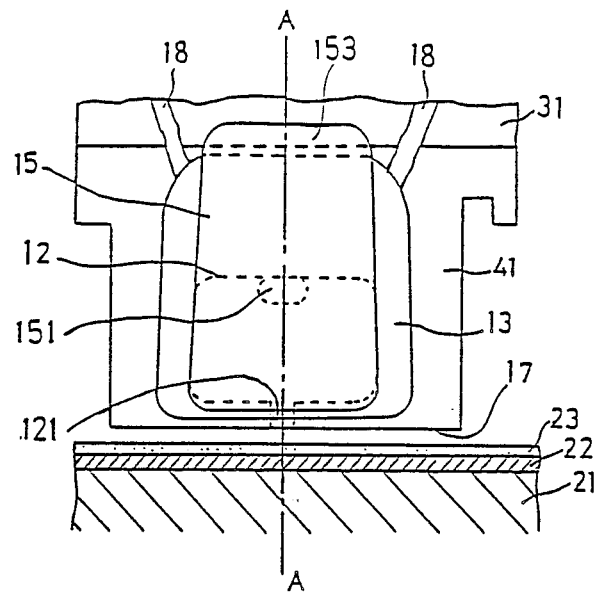
FIGS. 7(a) and 7(b) show a plan view and a cross section respectively of the first embodiment of the present invention.
Figure 7B:
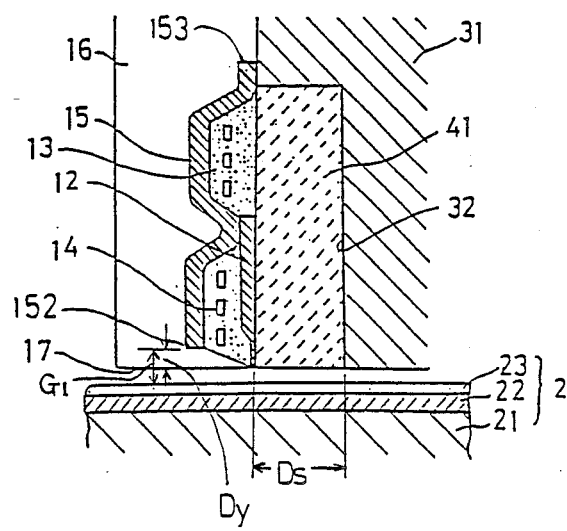

FIGS. 7(a) and 7(b) are a plan view and a cross section taken along the line A-A of FIG. 7(a) of the preferred embodiment of the magnetic head according to the present invention. A substrate 31 is a soft magnetic material such as of NiZn or MnZn ferrites. The substrate 31 has two functions as the second auxiliary magnetic pole previously explained and a slider for floating the magnetic head. The substrate 31 has a cut out portion 32 which is filled with non-magnetic insulating material 41. The cut out portion 32 has a depth ranging from 20 to 100 microns, preferably in a range of 60 to 80 microns in a horizontal direction of FIG. 7(b). As the non-magnetic insulating material, low melting point glass .or silicon dioxide (SiO₂) is used. The above depth buried by the non-magnetic material defines the distance Ds between the main magnetic pole 12 and the second auxiliary magnetic pole 31.

The main magnetic pole 12 is formed on a surface of the buried non-magnetic material 41, and has a thickness of about 3-5 microns except for the tip portion 121 thereof where the thickness is made small such as about 0.2-0.5 microns and the width thereof is made narrow such as about 10 microns. The magnetic material used therefor is any of permalloy (NiFe alloy), CoZr alloy, etc. A spiral coil 14 is disposed above the main magnetic pole 12 having a thickness of about 2-3 microns, and is buried in an intermediate insulating layer 13. The spiral coil 14 is made of electrically conductive material such as copper or aluminum thin film, and the center of the coil is disposed at a rear end of the main magnetic pole 12. The spiral coil 14 can be formed in a double-layer structure, and in some cases, in a multilayer structure.

A first auxiliary magnetic pole 15 made of thin film having a thickness of 3-5 microns, is formed above the coil 14, with the intermediate insulating layer 13 therebetween. The first auxiliary magnetic pole 15 has a distance from the main magnetic pole 12 of about 10-20 microns for single or double-layer structure of the spiral coil 14. The distance may increase to about 50 microns in the case of a four-layer structure of the spiral coil. The soft magnetic material such as permalloy or CoZr alloy is used for the first auxiliary magnetic pole 15. The tip portion 52 thereof is not the same level as that of the main magnetic pole 12. The gap G₁ between the recording medium 2 and the first auxiliary magnetic pole 15 is larger than that of the main magnetic pole. The recess dimension Dy in FIG. 7(b) is selected to be in a range from 10 to 20 microns. The center portion 151 protrudes toward and contacts the rear end portion of the main magnetic pole 12. Further, the rear end portion 153 of the first auxiliary magnetic pole 15 contacts the substrate 31 of soft magnetic material. Finally, a protective layer 16 of SiO₂ or Al₂O₃ is formed covering the entire surface.

In fabrication of the above magnetic head, sputtering, photolithography and other technologies of the prior art can be utilized. The front tip surface 17 of the whole assembly facing recording medium 2, including the protective layer 16, the main magnetic pole 12, and the substrate 31 with the buried non-magnetic insulating material 41, is flatly polished. The surface 17 works as a floating surface (an air bearing surface of the floating magnetic head) which contributes to maintain the precise gap from the recording medium. The tip portion 121 of the main magnetic pole and the end surface of the substrate 31 are on the same level, however, the tip portion 152 of the first auxiliary magnetic pole is buried in the protective layer 16 and has a recess dimension Dy from the tip surface 17. The provision of the recess Dy contributes to minimize other edge noise caused by the first auxiliary magnetic pole. When this feature is combined, a magnetic head with minimum edge noises can be obtained resulting in enhancing the recording and reproducing efficiencies.

Figure 8:
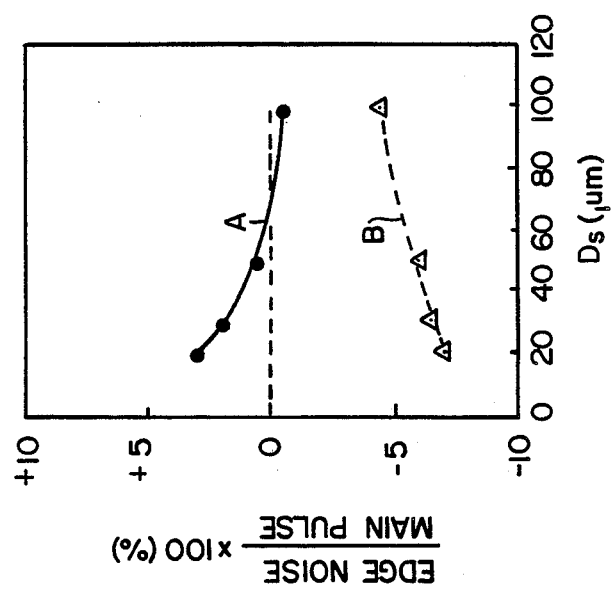
FIG. 8 shows curves of edge noise to main signal pulse ratio data for a magnetic head of the present invention and the prior art respectively.

FIG. 8 shows data of edge noise to main pulse ratio expressed as a percentage using the magnetic head of the above embodiment. In the figure, the abscissa shows a distance Ds between the main magnetic pole 12 and the side surface 32 of the substrate 31. Curve A is obtained by using computer simulation to change the distance Ds. The curve A crosses the zero level in a Ds range of about 60–80 microns. When Ds is smaller than the above range, edge noise has a positive polarity such as shown in FIG. 5(b) and, when Ds is larger than the above range, it has a negative polarity as shown in FIG. 6(b). The above data shows that the edge noise almost vanishes when the portion filled with the non-magnetic insulating material 41 in FIG. 7(b) has the depth (Ds) of about 60–80 microns. However, the Ds value satisfying the cancellation condition can vary in a range from 20 to 100 microns depending upon other magnetic structure of the magnetic head, which includes the thickness, width, permeability, etc. of the main magnetic pole, and the first and second auxiliary magnetic poles.

Figure 1:
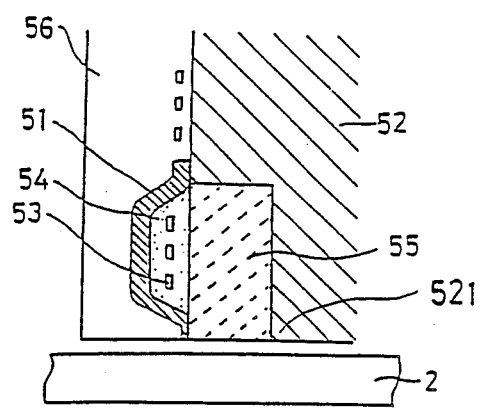
FIG. 1 shows a schematic cross section of a prior art thin film magnetic head having a main magnetic pole and a soft magnetic substrate.
Figure 2A:
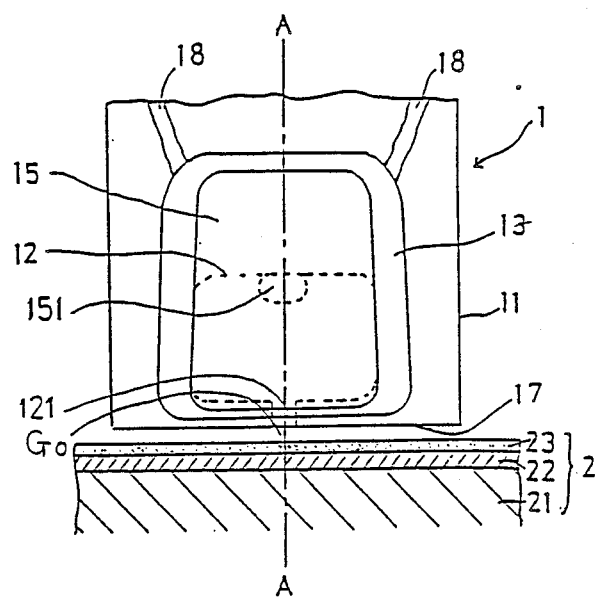

Curve B of FIG. 8 shows the data taken in the similar way for the magnetic head of the prior art shown in FIG. 1. The edge noise has a negative polarity and has a much greater magnitude than that of curve A. To reduce the edge noise, it is known that it is effective to remove the corner portion 521 of the substrate 52 which contacts with non-magnetic material 55 and faces the recording medium 2 for the magnetic head in FIG. 1 of the prior art. However, the edge noise can not be made to disappear, and the fabrication of the magnetic head having a cut out portion in the substrate 52 is a difficult process.

As explained above, the thin film magnetic head of the first embodiment has special features of a high recording density and a high reproducing efficiency without edge noise, and the fabrication thereof is easy. Further, magnetic disturbance induced by external parts or circuits are absorbed in the soft magnetic material of the substrate 31 in FIG. 7(b), and therefore, the magnetic disturbance does not affect the functions of the main magnetic pole 12. However, the substrate material such as NiZn ferrite or MnZn ferrite is inferior to other thin soft magnetic materials used in high frequency characteristic.

Figure 9A:
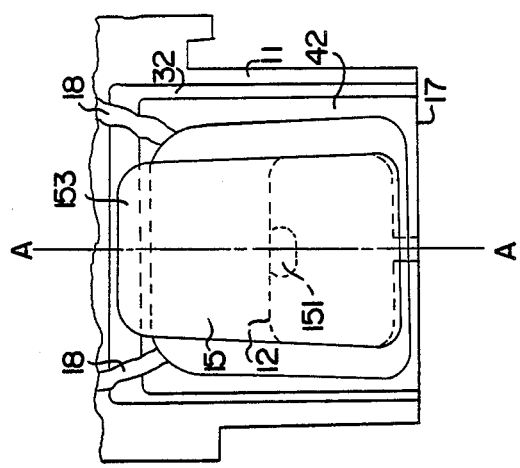
FIGS. 9(a) and 9(b) show a plan view and a cross section respectively of a second embodiment of the present invention.
Figure 9B:
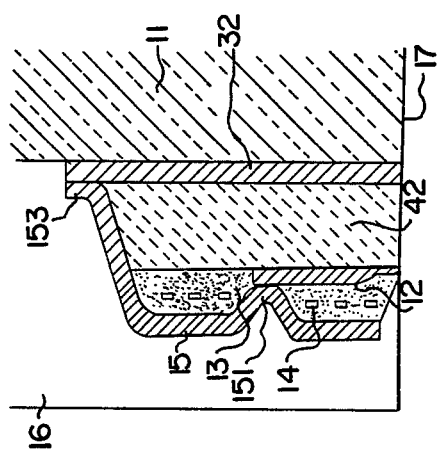

In order to further improve the recording and reproducing efficiencies in a high-speed operation such as of several tens of MHz, a second embodiment of the present invention is next explained. The second embodiment of a thin film magnetic head according to the present invention is shown in FIGS. 9(a) and 9(b), which can solve the above problem in the high-speed operation. The special features of the embodiment exist in that a second auxiliary magnetic pole 32 is made of a thin film of soft magnetic material having a superior characteristic at high-speed operation, which is formed on a non-magnetic substrate 11. The substrate 11 works as a slider for the floating magnetic head. FIG. 9(a) shows a plan view of the second embodiment and FIG. 9(b) shows a cross section thereof taken along the line A-A of FIG. 9(a).

The substrate 11 is made of non-magnetic material such as $Al_2O_3 \cdot TiC$, and the thin soft magnetic film 32 of permalloy or CoZr is deposited on the substrate 11 by a sputtering method. The thin magnetic film 32 functions as the second auxiliary magnetic pole 3 of FIG. 4. The thickness of the thin magnetic film 32 is about 3–5 microns which is similar as that of the first auxiliary magnetic pole 15. A non-magnetic insulating layer 42 of $SiO_2$ or $Al_2O_3$ is formed covering a substantial part of the second auxiliary magnetic pole 32 and the thickness thereof defines the distance Ds explained in the first embodiment. On a surface of the non.-magnetic insulating layer 42, a main magnetic pole 12, an intermediate insulating layer 13, a thin film coil 14, and a first auxiliary pole 15 are formed in that order. The structure of the main magnetic pole 12, the thin film coil 14, and the first auxiliary magnetic pole 15 is formed in a similar way as in the first embodiment. Therefore, the distance Ds and the shape and disposition of the first auxiliary magnetic pole 15 with regard to the main magnetic pole 12 are arranged in a similar way. However, the rear end portion 153 of the first auxiliary magnetic pole 15 contacts with a rear end of the exposed second auxiliary magnetic pole 32. A protective layer 16 covers the entire head assembly.

By using the structure of the second embodiment, in which the second auxiliary magnetic pole 32 of thin soft magnetic film is formed on the non-magnetic substrate 11, superior high efficiency in recording and reproducing can be obtained without the edge noise.

Although only two embodiments of the invention have been disclosed and described, it is apparent that other embodiments and modifications of the invention are possible. The above explanation has been given emphasizing provision of the distance Ds between the main magnetic pole and the second auxiliary magnetic pole, however, other methods are possible in which a magnetic resistance along the path $PAS_1$ is substantially equal to that along the $PAS_2$. Many modifications are possible for satisfying the cancellation condition, in which any of the magnetic pole configuration, thickness thereof, material thereof, etc. can be changed.

Figure 10A:
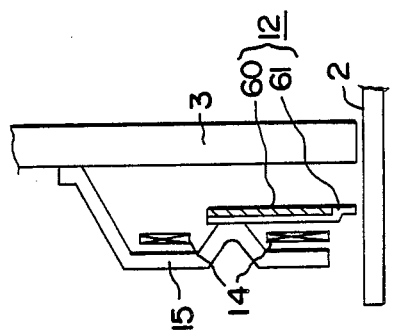
FIGS. 10(a), 10(b) and 10(c) show an example for adjustment of the magnetic resistance along the magnetic enclosures.
Figure 10C:
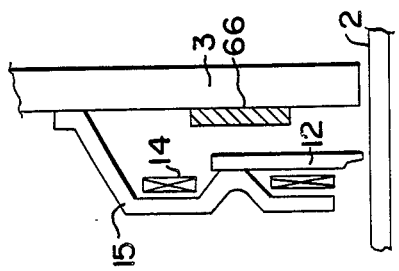
Figure 10B:
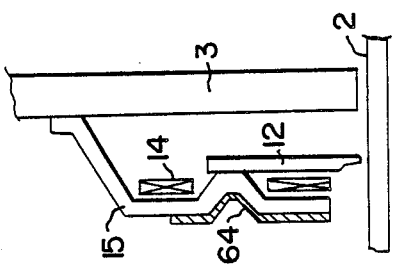

Three examples are shown. in FIGS. 10(a), 10(b) and 10(c). FIG. 10(a) shows a configuration where the main magnetic pole 12 is composed of a double layer 60 and 61, each having a different permeability. FIG. 10(b) shows an additional magnetic layer 64 added to adjust a magnetic resistance along the magnetic paths. FIG. 10(c) shows an additional magnetic layer 66 added to the auxiliary magnetic pole 3 to adjust a magnetic resistance along the magnetic paths.

The presently disclosed embodiments are therefore to be considered in all respects as illustrative and not restrictive, the scope of the invention being indicated by the appended claims, rather than the foregoing description, and all changes which come within the meaning and range of equivalence of the claims are, therefore, to be embraced therein.

We claim:

1. A thin film magnetic head for perpendicularly recording information on and reproducing information from a recording medium, the magnetic head comprising:

a first thin magnetic film for recording and reproducing, the tip portion thereof being arranged close to or in contact with the recording medium, a conductive thin film coil disposed to a side of said first thin magnetic film, adjacent to and substantially parallel to a plane thereof, the center of the coil being arranged at a rear end portion of said first thin magnetic film, a second thin magnetic film disposed on one side of said first thin magnetic film adjacent to and substantially parallel to said coil and covering a front and a rear portion of said coil, the center portion of the second thin magnetic film contacting the rear end portion of said first thin magnetic film, an auxiliary magnetic pole-disposed on the other side of said first thin magnetic film, a tip portion of said auxiliary magnetic pole being positioned such that it is the same distance from the recording medium as the tip of said first thin magnetic film, wherein the rear end portion of said second thin magnetic film contacts said auxiliary magnetic pole, and said first and second thin magnetic films and said auxiliary magnetic pole forming first and second magnetic paths, each magnetic path interlinking said coil, wherein the first magnetic path includes the tip portion of said auxiliary magnetic pole, a front portion of said auxiliary magnetic pole, said first thin magnetic film through a distributed magnetic leakage path, the front portion of said second thin magnetic film, and the recording medium, and the second magnetic path includes the tip portion of said auxiliary magnetic pole, said auxiliary magnetic pole, the rear portion of said second thin magnetic film, said first thin magnetic film, and the recording medium, and wherein said first and second magnetic films and said auxiliary magnetic pole are arranged such that when the magnetic head is excited by a magnetic transition of the recording medium, the magnetic flux induced at the tip portion of said auxiliary magnetic pole flowing through the first and second magnetic paths are substantially equal and opposite in direction to each other.

2. A thin film magnetic head as recited in claim 1, wherein the distance between said first thin magnetic film and auxiliary magnetic pole is a predetermined distance.

3. A thin film magnetic head as recited in claim 2, wherein said predetermined distance is in a range between 20 and 100 microns.

4. A thin film magnetic head as recited in claim 3, wherein the distance between said first and second thin magnetic films is less than 50 microns.

5. A thin film magnetic head as recited in claim 4, wherein said thin film coil is a single layer and the distance between said first and second thin magnetic films is less than 20 microns.

6. A thin film magnetic head as recited in claim 4, wherein said thin film coil is a double layer and the distance between said first and second thin magnetic films is less than 20 microns.

7. A thin film magnetic head as recited in claim 1, wherein said auxiliary magnetic pole is a third thin magnetic film formed on a substrate of non-magnetic material, facing said first thin magnetic film.

8. A thin film magnetic head as recited in claim 1, wherein said auxiliary magnetic pole is a substrate of magnetic material having a cut out portion facing said first and second thin magnetic films, said cut out portion being filled with non-magnetic material, wherein the depth thereof defines a predetermined distance between said first thin magnetic film and auxiliary magnetic pole.

9. A thin film magnetic head as recited in claim 1, wherein said magnetic head further includes an additional means for adjusting a magnetic resistance of said first or second magnetic paths.

10. A thin film magnetic head as recited in any of claims 1 to 8, wherein the tip portions of both said first thin magnetic film and said auxiliary magnetic pole form a planar surface with an intermediate material positioned therebetween.

11. A thin film magnetic head as recited in claim 10, wherein the tip position of said second thin magnetic film is recessed from the level of said planar surface.

12. A thin film magnetic head as recited in claim 1, wherein the tip of said first thin magnetic film has a narrow width portion and a thin thickness portion facing the recording medium.

13. A thin film magnetic head as recited in claims 7 or 8, wherein said thin film magnetic head is a floating head type, and the front tip surface of said substrate facing the recording medium has a flat surface and forms a slider which maintains the magnetic head close to or in contact with the recording medium.

14. A thin film magnetic head for perpendicularly recording information on and reproducing information from a recording medium, the magnetic head comprising:
- a substrate of soft magnetic material, a side portion thereof being partially removed and filled with a non-magnetic insulating material having a predetermined thickness and forming a flat surface with the substrate,
- a first-thin magnetic film formed on said non-magnetic insulating material, the tip portion thereof being flush with a front tip surface of said substrate facing the recording medium,
- a coil of a conductive thin film, the front portion thereof being disposed above said first thin magnetic film and the rear portion thereof being disposed above the non-magnetic insulating material filling said substrate both front and rear portions being buried in an intermediate insulating layer, and the center of said coil being arranged at the rear end portion of said first thin film, and
- a second thin magnetic film disposed on the intermediate layer and covering the front and rear portions of said coil, the center portion of said second thin magnetic film contacting the rear end portion of said first thin magnetic film through the coil center, and rear end portion of the second thin film contacting said substrate.

15. A thin film magnetic head as recited in claim 14, wherein said predetermined thickness ranges from 20 to 100 microns.

16. A thin film magnetic head as recited in claim 15, wherein the distance between said second thin magnetic film and said first thin magnetic film is less than 50 microns.

17. A thin film magnetic head for perpendicularly recording information on and reproducing information from a recording medium, the magnetic head comprising:
- a substrate of non-magnetic-material,
- an auxiliary thin magnetic film formed on said substrate,
- a first insulating layer formed on said auxiliary thin magnetic film and having a predetermined thickness,
- a first thin magnetic film formed on said first insulating layer, the front tip portion thereof being flush with the front tip portions of said substrate and auxiliary thin magnetic film and first insulating layer, said front tip portions facing the recording medium,
- a coil of a conductive thin film, the front portion thereof being disposed above said first thin magnetic film and the rear portion thereof disposed above said first insulating layer, both portions being buried in a second insulating layer, wherein the center of said coil is positioned at the rear end portion of the first thin magnetic film, and
- a second thin magnetic film formed on said second insulating layer at a distance from said first thin magnetic film, smaller than said predetermined thickness and covering the front and rear portions of said coil, the second thin magnetic film further extending to cover rear peripheral portions of said first and second insulating layers and contacting said auxiliary thin magnetic film at the rear end portion thereof, the center portion of said second thin magnetic film contacting the rear end portion of said first thin magnetic film through the center of said coil.

18. A thin film magnetic head as recited in claim 17, wherein said predetermined thickness ranges from 20 to 100 microns and the distance between said first thin magnetic film and said second insulating layer is less than 50 microns.

* * * * *